(12) United States Patent
Ryu et al.

(10) Patent No.: US 8,306,546 B2
(45) Date of Patent: Nov. 6, 2012

(54) METHOD AND APPARATUS FOR PROVIDING MACHINE-TYPE COMMUNICATION SERVICE IN WIRELESS COMMUNICATION SYSTEM

(75) Inventors: Jin Sook Ryu, Anyang-si (KR); Dong Keun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/028,502

(22) Filed: Feb. 16, 2011

(65) Prior Publication Data

US 2011/0201344 A1 Aug. 18, 2011

Related U.S. Application Data

(60) Provisional application No. 61/305,138, filed on Feb. 17, 2011.

(30) Foreign Application Priority Data

Jan. 27, 2011 (KR) .................. 10-2011-0008019

(51) Int. Cl.
*H04W 72/00* (2009.01)
*H04B 7/00* (2006.01)

(52) U.S. Cl. ............... 455/450; 455/522; 455/432.3

(58) Field of Classification Search .......... 455/522, 455/432.3, 500, 450, 424, 411, 458, 524, 455/456.1, 404.2, 456.6, 417; 370/235, 400, 370/311, 331, 254, 255
See application file for complete search history.

(56) References Cited

U.S. PATENT DOCUMENTS

| | | | |
|---|---|---|---|
| 2005/0119008 A1 | 6/2005 | Haumont | |
| 2005/0255872 A1* | 11/2005 | Lundell et al. | 455/522 |
| 2006/0068780 A1* | 3/2006 | Dalsgaard et al. | 455/432.3 |
| 2011/0199905 A1* | 8/2011 | Pinheiro et al. | 370/235 |
| 2012/0040700 A1* | 2/2012 | Gomes et al. | 455/500 |

OTHER PUBLICATIONS

Extended European Search Report from corresponding EP 11001306.7 dated Jul. 20, 2011.
Huawei, MTC group subscription, 3GPP TSG SA WG2 Meeting #78, TD S2-1 1083, pp. 1-5, Feb. 22-26, 2010, San Francisco, CA.
Panasonic, Solution for Group-based Optimization, 3GPP TSG SA WG2 Meeting #78, TD S2-101288, pp. 1-2, Feb. 22-26, 2010, San Francisco, CA.
Intel, MTC Low Mobility-Optimizing periodic LU/RAU/TAU signalling, 3GPP TSG SA WG2 Meeting #78, TD S2-101420, pp. 1-3, Feb. 22-26, 2010, San Francisco, CA.
3GPP TR 23.888V0.2.1, Technical Specification Group Services and System Aspects; System Improvements for machine-Type Communications, Release 10, Jan. 2010.
Huawei Technologies et al., M2M TS 22.368 Chapter 7.1.3: Group Based, 3GPP TSG-SA WG1 Meeting #48, S1-094348, Beijing, China Nov. 16-20, 2009.
3GPP TS 22.368V1/1/1. Technical Specification Group Services and System Aspects; Service requirements for machine-type communications, Stage1, Release 10, Nov. 2009.

* cited by examiner

*Primary Examiner* — Kiet Doan
(74) *Attorney, Agent, or Firm* — Morgan, Lewis & Bockius LLP

(57) ABSTRACT

A method and apparatus of providing a machine-type communication (MTC) service in a wireless communication system is provided. The method include transmitting information of an MTC group, to which an MTC device belongs, to the MTC device, wherein the MTC group is a group of MTC devices that share one or more MTC features, and wherein the information of the MTC group includes an identifier (ID) of the MTC group.

11 Claims, 7 Drawing Sheets

METHOD AND APPARATUS FOR PROVIDING MACHINE-TYPE COMMUNICATION SERVICE IN WIRELESS COMMUNICATION SYSTEM

CROSS-REFERENCE TO RELATED APPLICATIONS

This application claims the benefit of priority of U.S. Provisional application No. 61/305,138 filed on Feb. 17, 2010, and Korean Patent application No. 10-2011-0008019 filed on Jan. 27, 2011, all of which are incorporated by reference in their entirety herein.

BACKGROUND OF THE INVENTION

1. Field of the Invention

The present invention relates to wireless communications, and more particularly, to a method and apparatus for providing a machine-type communication (MTC) service in a wireless communication system.

2. Related Art

A global system for mobile communication (GSM) is a radio technology which has been developed as a system for standardizing radio communication systems in Europe. A general packet radio service (GPRS) is a technique introduced to provide a packet switched data service in a circuit switched data service provided from the GSM. The GPRS constitutes a GSM/EDGE radio access network (GERAN). A universal mobile telecommunication system (UMTS) is a wireless communication system based on wideband code division multiple access (WCDMA). E-UTRAN is a wireless communication system based on orthogonal frequency division multiple access (OFDMA).

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Meanwhile, the number of MTC devices is expected to be much greater than the number of legacy devices, and a probability of performing operations of the plurality of MTC devices simultaneously is high due to a feature of a typical machine-to-machine (M2M) service. Therefore, there is a possibility that a network resource is not enough, and thus a method of effectively handling a network signaling load for the MTC device is very important. Accordingly, overload control for handling an overload in core network signaling and radio access network (RAN) signaling has been recently emerged as the most important issue in the MTC.

Various methods can be proposed for the overload control. Although a method of limiting access of the MTC device in a case where a network has an unnecessary overload has been proposed up to now, a method of minimizing a signaling load may be proposed. Accordingly, a method of minimizing a signaling load by the use of simultaneous signaling by grouping the MTC devices may be proposed. This can be called MTC group handling.

There is a need to define information for effective operation control of the MTC device when the MTC group handling is performed.

SUMMARY OF THE INVENTION

The present invention provides a method and apparatus for providing a machine-type communication (MTC) service in a wireless communication system.

In an aspect, a method of providing a machine-type communication (MTC) service in a wireless communication system is provided. The method include transmitting information of an MTC group, to which an MTC device belongs, to the MTC device, wherein the MTC group is a group of MTC devices that share one or more MTC features, and wherein the information of the MTC group includes an identifier (ID) of the MTC group.

The information of the MTC group may be transmitted using a system information (SI) message of a GSM/EDGE radio access network (GERAN).

The information of the MTC group may be transmitted by being added to a Reset octets information of SI13 in the SI message.

The information of the MTC group may be transmitted using a paging request message.

The information of the MTC group may be transmitted by being added to $3^{rd}$ mobile identify information of a paging request type2 message in the paging request message.

The information of the MTC group may be transmitted by being added to a paging request type4 message newly defined in the paging request message.

The information of the MTC group may include MTC access period information indicating a time range in which the MTC device in the MTC group is accessible to a network.

The information of the MTC group may include MTC access priority information indicating a network access right of the MTC group and determined based on a network load.

The information of the MTC group may include MTC offline indication period information indicating a threshold of a time for reporting network inaccessibility to the network when the MTC device in the MTC group is unable to access to the network.

The threshold may be a cycle of a periodic routing area update (RAU).

The method may further include transmitting a general packet radio service (GPRS) attach accept message and an RAU accept message to the MTC device.

The GPRS attach report message and the RAU accept message may include the information of the MTC group.

In another aspect, a network operator in a wireless communication system is provided. The network operator include a radio frequency (RF) unit configured for transmitting information of a MTC group, to which an MTC device belongs, to the MTC device, and a processor coupled to the RF unit, wherein the MTC group is a group of MTC devices that share one or more MTC features, and wherein the information of the MTC group includes an ID of the MTC group.

In another aspect, a MTC device in a wireless communication system is provided. The MTC device include a RF unit configured for receiving information of an MTC group to which an MTC device belongs, and a processor, coupled to the RF unit, configured for processing information of the MTC group, wherein the MTC group is a group of MTC devices that share one or more MTC features, and wherein the information of the MTC group includes an ID of the MTC group.

DESCRIPTION OF EXEMPLARY EMBODIMENTS

Machine-type communication (MTC) is one type of data communication including one or more entities not requiring human interactions. An MTC device denotes a mobile station (MS) installed for the MTC. The MTC device may communicate with an MTC server or another MTC device. An MTC feature denotes a network function that optimizes a network used by a machine-to-machine (M2M) device. The MTC server communicates with the network, and is an entity that communicates with the MTC device through the network. The MTC server may have an interface that is accessible by an MTC user. The MTC server provides a service for the MTC user. The MTC user uses the service provided by the MTC server. An MTC subscriber is an entity that has a contractual relation with a network operator to provide a service to one or more MTC devices. An MTC group denotes a group of MTC devices that share one or more MTC features and that belong to the same MTC subscriber. The MTC subscriber and the MTC group may be used without distinction.

Although it is described hereinafter that the network is based on a GSN/EDGE radio access network (GERAN), the present invention is not limited thereto. Thus, various types of network may be used such as UMTS terrestrial radio access network (UTRAN), evolved-UTRAN (E-UTRAN), or the like.

A mobile station (MS) denotes a typical wireless apparatus that receives a service based on the GERAN, and can be referred to as other terms such as a user equipment (UE), a user terminal (UT), a subscriber station (SS), a mobile terminal (MT), a wireless device, etc.

Figure 1:
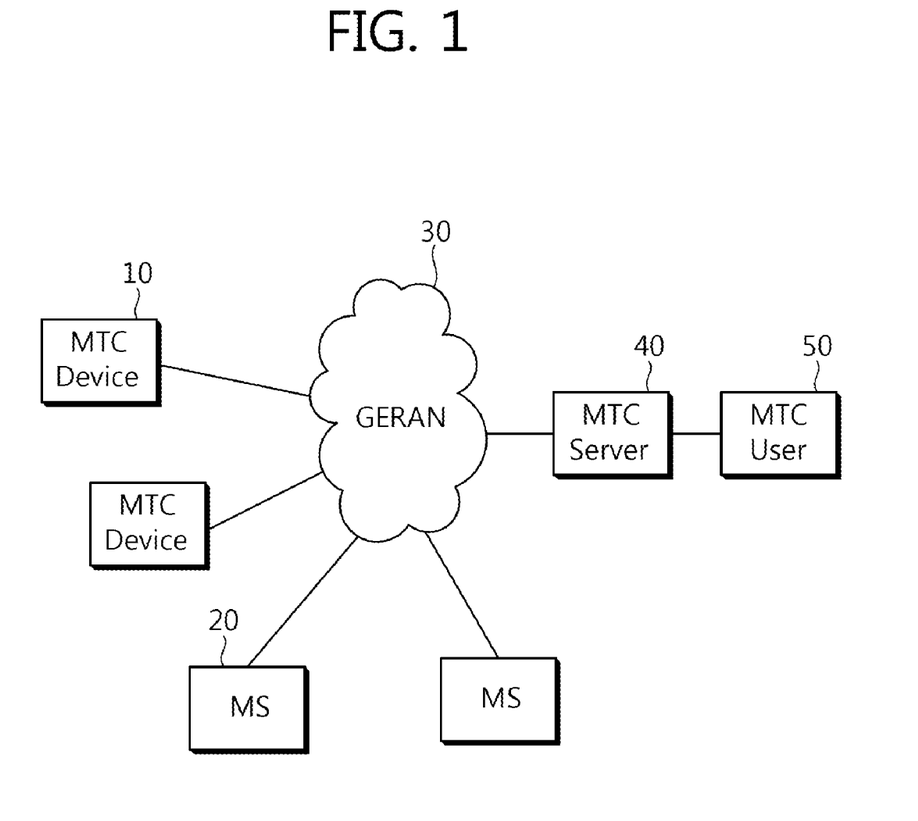
FIG. 1 shows an example of a communication scenario for MTC.

FIG. 1 shows an example of a communication scenario for MTC. An MTC device 10 is connected to a network, i.e., a GERAN 30, together with a legacy MS 20. An MTC server 40 receives information of the MTC device 10 through the GERAN 30, and provides the information to an MTC user 50. The MTC server 40 may be directly connected to the GERAN 30, or may be connected to the GERAN 30 via the MTC server 40.

Hereinafter, an uplink denotes communication from the MTC device 10 or the MS 20 to the GERAN 30, and a downlink denotes communication from the GERAN 30 to the MTC device 10 or the MS 20.

The aforementioned structure is for exemplary purposes only, and thus may change in various forms. For example, the MTC device 10 may directly communicate with another MTC without the use of the MTC server 40.

If the MTC device 10 is connected to the GERAN 30, a traffic load of the GERAN 30 may increase according to a traffic feature of the MTC device 10. This may cause a problem of deteriorating a service for the legacy MS 20. Therefore, in order to decrease the traffic load caused by the MTC device 10, resource allocation of the MTC device 10 needs to be managed flexibly according to a traffic feature and/or current network congestion.

In the MTC, MTC devices may communicate with one or more MTC servers, or may communicate with one another.

Figure 2:
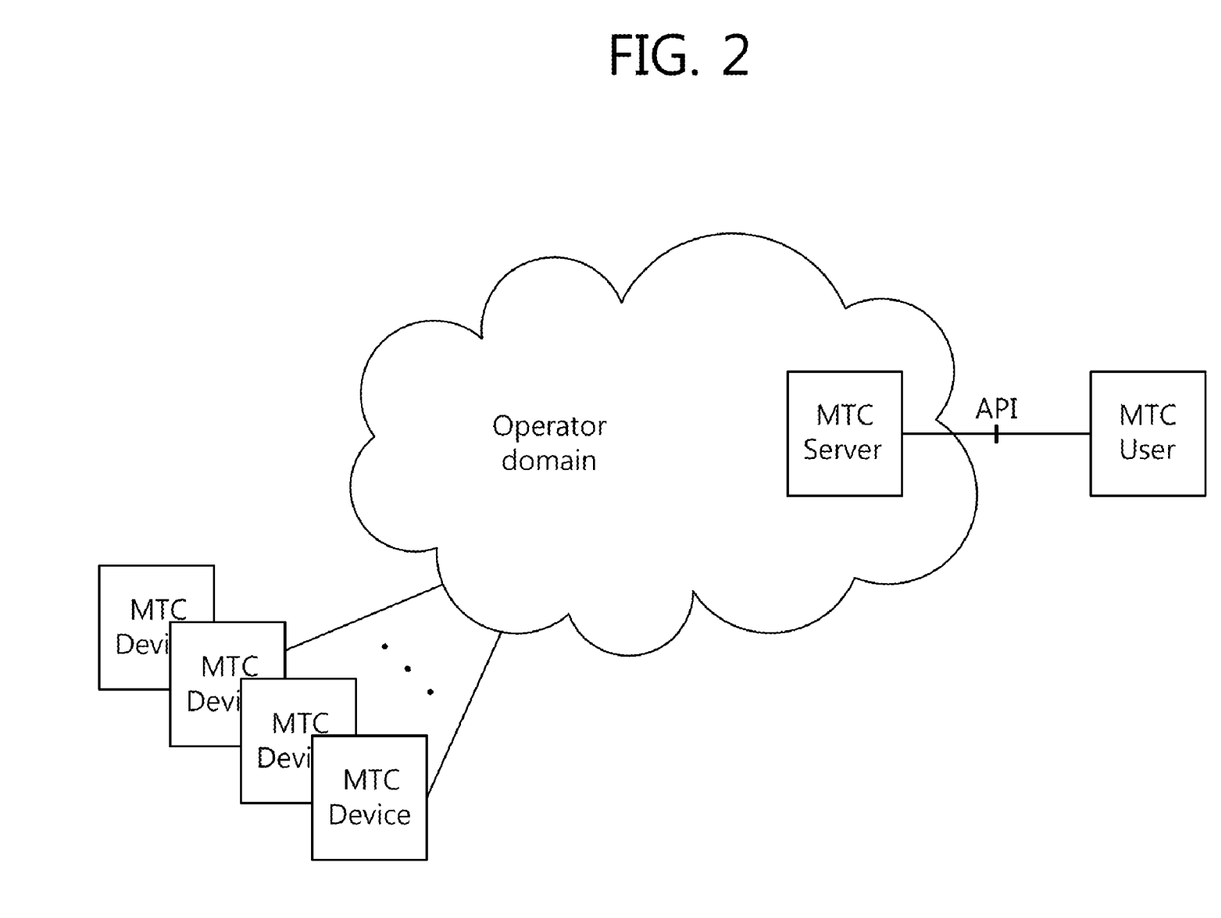
FIG. 2 and FIG. 3 show an example of communication between an MTC server and MTC devices.
Figure 3:
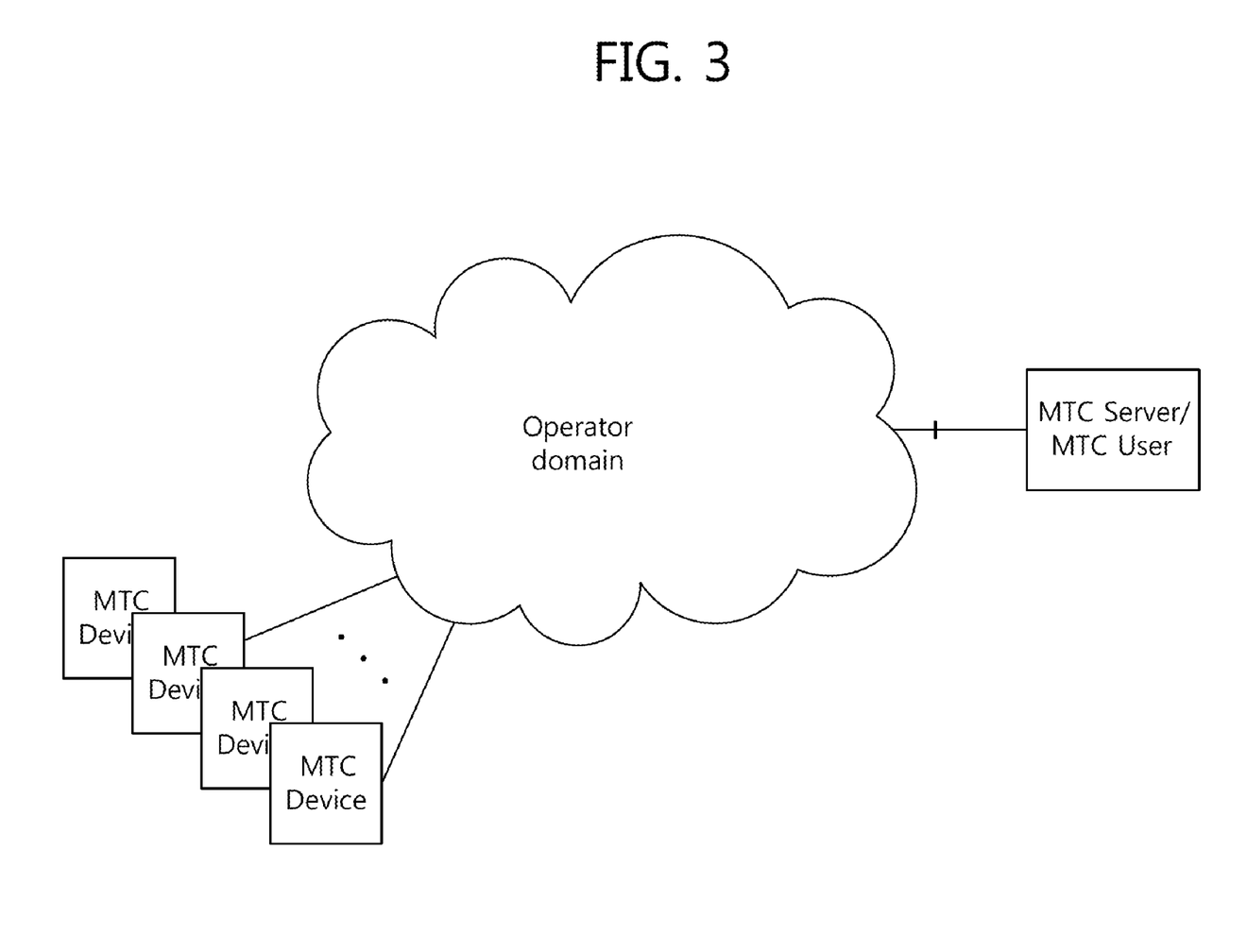

FIG. 2 and FIG. 3 show an example of communication between an MTC server and MTC devices. Referring to FIG. 2, the MTC server is controlled by a network operator. That is, the MTC server is located inside a network operator domain. The network operator provides an application programming interface (API) such as an open system architecture (OSA) or the like to the MTC server. An MTC user accesses to the MTC server of the network operator through the API. Referring to FIG. 3, the MTC server is not controlled by the network operator. That is, the MTC server is located outside the network operator, and the network operator provides network connectivity to the MTC server.

Figure 4:
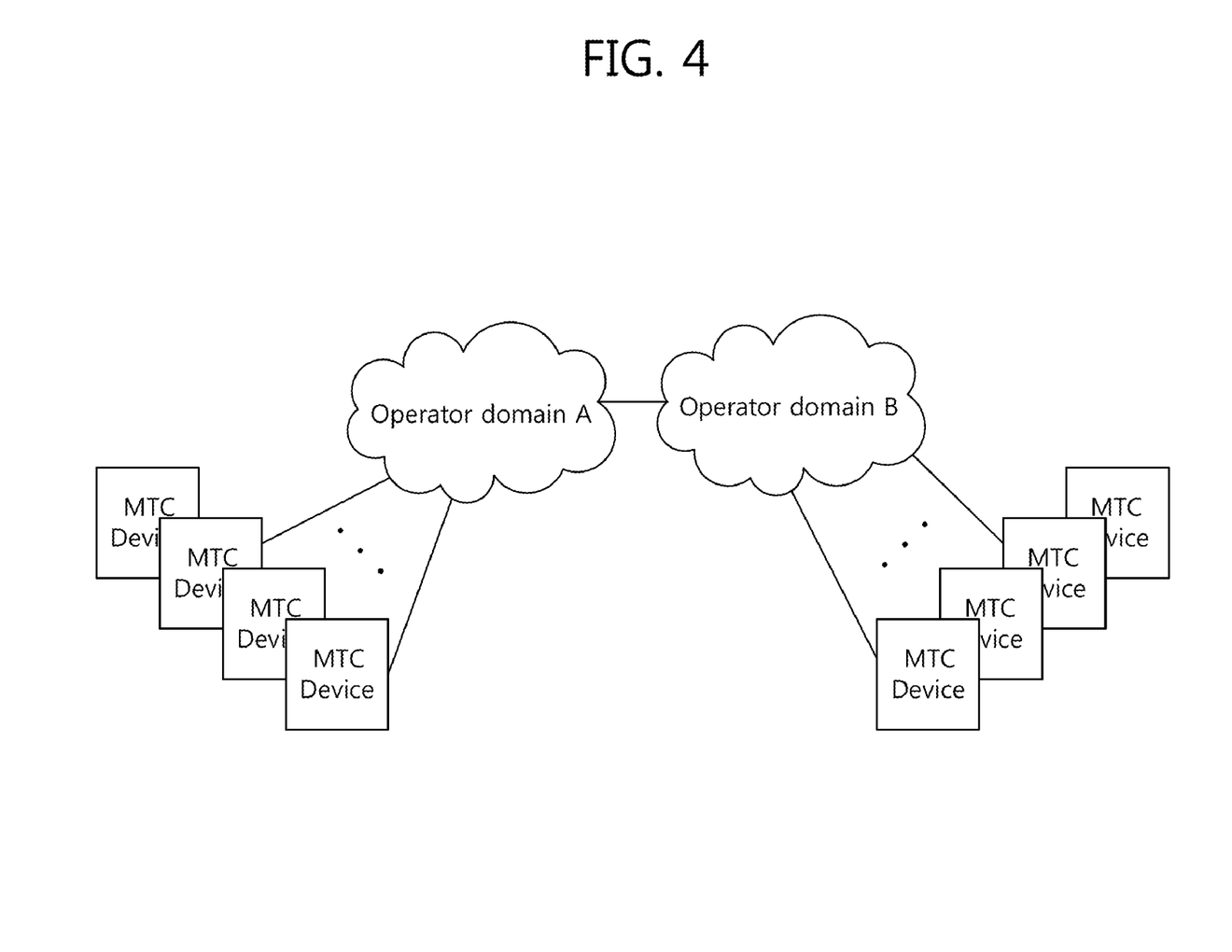
FIG. 4 shows an example of direct communication between MTC devices without the use of an MTC server.

FIG. 4 shows an example of direct communication between MTC devices without the use of an MTC server. Referring to FIG. 4, a network operator A and a network operator B are directly connected to each other, and the MTC devices communicate with each other without the use of the MTC server.

Since MTC devices can exist for various fields, the same feature is not required in all MTC devices. That is, system optimization does not have to be suitable to all MTC devices. An MTC feature is defined to provide a structure for optimization of different systems. Such an MTC feature may be provided on a subscription basis. In addition, the MTC feature may be activated individually.

In order for the MTC device to operate in the existing network, a service requirement different from that of the legacy MS is required. The service requirement includes a common service requirement and a specific service requirement. For the service requirement for the MTC feature, 3GPP TS 22.368 V1.1.1 (2009-11) "3rd Generation Partnership Project; Technical Specification Group Services and System Aspects; Service requirements for machine-type communications; Stage 1 (Release 10)" may be incorporated herein by reference.

The specific service requirement of the MTC feature includes low mobility, time controlled, time tolerant, MTC monitoring, offline indication, jamming indication, priority alarm message (PAM), extra low power consumption, secure connection, etc. Among the various service requirements, the time controlled, the time tolerant, the offline indication, the PAM, etc., will be described hereinafter in detail.

1) Time controlled: According to the time controlled feature, the MTC device can transmit or receive data only at certain pre-defined periods. Therefore, unnecessary signaling outside these pre-defined periods can be avoided. The following conditions may be required to implement the time controlled feature.

It shall be possible for the network operator to allow access of data transmission or reception only during a defined time period.

It shall be possible for the network operator to alter the access period based on criteria (e.g. daily traffic load, etc.).

It shall be possible for the network operator to share the altered access period with the MTC device and the MTC user.

2) Time tolerant: According to the time tolerant feature, the MTC devices can delay their data transfer. The following conditions may be required to implement the time tolerant feature.

It shall be possible for the network operator to restrict MTC device's access to the network or the sending of data towards another MTC device and to dynamically limit the amount of data that can be transferred by the MTC device in a specific area, when the network load is greater than a pre-defined load threshold.

The network operator shall be capable of pre-defining a load threshold per MTC subscription.

It shall be possible for the MTC device to determine the load of the network.

3) Offline indication: The offline indication feature can be supported for the MTC device that requires a timely notification when it is no longer possible to establish signaling between the MTC device and the network. The following conditions may be required to implement the offline indication feature.

The system shall provide an efficient mechanism to detect the condition when it is no longer possible to establish signaling between the MTC device and the network.

The network shall provide a notification to the MTC server and/or MTC user immediately after the loss of connective condition is detected.

The maximum offline indication detection time (i.e. the time between when the actual loss of connectivity occurred and when the loss of connectivity was detected) shall be configurable per MTC subscription.

4) PAM: The PAM feature can be supported for the MTC device that preferentially sends a priority alarm in the event of theft, vandalism, or other needs for immediate attention. The following conditions may be required to implement the PAM feature.

The PAM shall take precedence over any other service requirements.

Meanwhile, overload control has recently been emerged as the most important issue in the discussion on the MTC. Among the specific service requirements, the time controlled feature is related to the overload control in particular. When access of the MTC device is allowed only at certain periods by the network operator and the access periods are altered as a communication window is updated by the network operator, the MTC device may initialize non-access stratum (NAS) signaling outside a new communication window. In this case, the network may deny the request of the MTC device and return a new access period in response, or may allow a first access out of the new access period and provide the access period as a new access period in a next access. In addition, when the access period is altered, information on the new access period is given to the MTC device after an NAS signaling connection is established. Therefore, in a situation where the network denies the request of the MTC device and attempts re-access during the new access period, at least first signaling connection attempt is an unnecessary attempt when the access period is altered for each MTC device. In addition, the possibility that the number of MTC devices is much greater than the number of human-to-human (H2H) devices is high, and a one-to-one connection between the network and the MTC device may cause an overload of the network.

Accordingly, instead of handling the MTC devices individually, a plurality of MTC devices may be aggregated to be handled as a group, and in this manner, a network load can be decreased. Each MTC device belongs to the MTC group. Each group is uniquely identified in a GERAN. The MTC devices having the same access period in the MTC group are distributed in a full access period in order to decrease a signaling load. To satisfy this, each MTC device may randomize its access period within the full access period.

Hereinafter, a method of providing an MTC service by using MTC group handling is proposed. More specifically, the method of providing the MTC service by using a system information (SI) message or a paging request message will be proposed. The MTC service that can be provided using the MTC group handling may include the time tolerant feature, the offline indication feature, the PAM feature, and the like, in addition to the aforementioned time controlled feature. The SI of the current GERAN includes only information related to operation control of the legacy MS, and information that satisfies a service requirement in regard to the MTC device is not defined yet. In addition, the paging request message of the current GERAN includes only information related to a circuit, packet, or multimedia broadcast and multicast service (MBMS) of the legacy MS, and does not include information related to the MTC device. Therefore, the present invention proposes a method in which information necessary for MTC group handling is newly defined in the SI or paging request message.

First, a method of providing an MTC service by using the SI message will be described.

Figure 5:
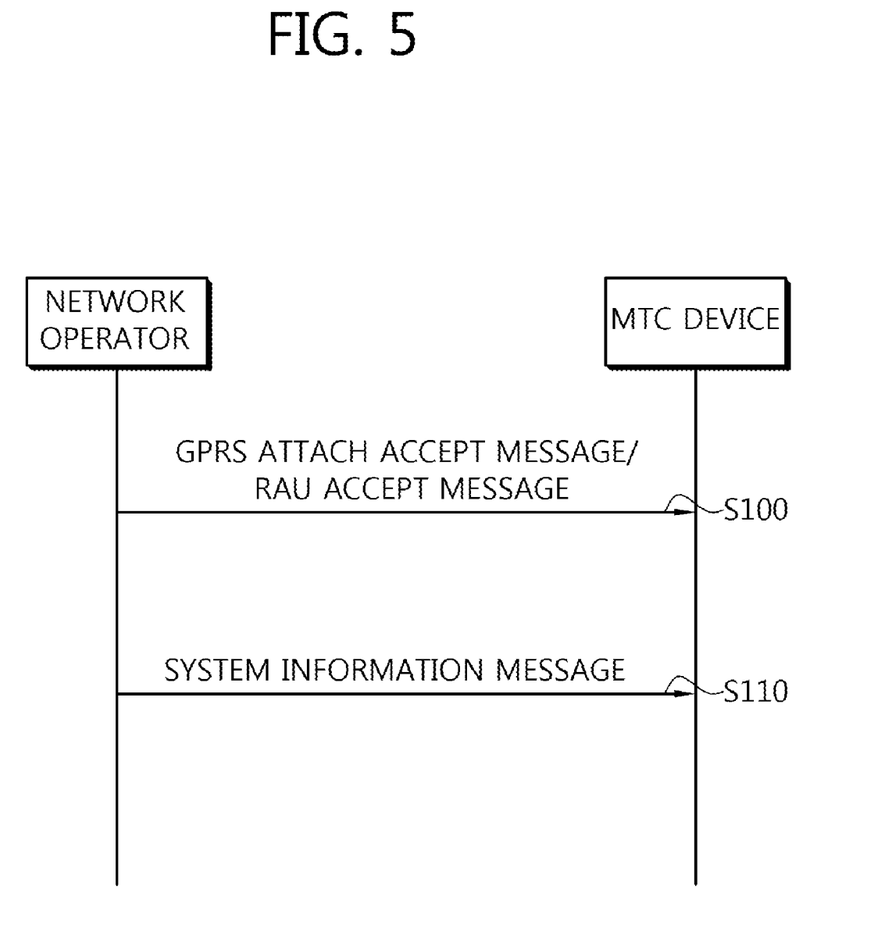
FIG. 5 shows an example of the proposed method of providing an MTC service.

FIG. 5 shows an example of the proposed method of providing an MTC service.

In step S100, a network operator transmits a general packet radio service (GPRS) attach accept message and a routing area update (RAU) accept message to an MTC device. The GPRS attach accept message is a message received by the MTC device from a network while attempting a GPRS attachment to the network. The RAU accept message is a message received by the MTC device from the network while attempting an RAU to the network. The GPRS attach accept message and the RAU accept message include MTC group information. More particularly, the MTC group information may include an MTC access period field, an MTC access priority field, and an MTC offline indication period of an MTC group to which the MTC device belongs. Table 1 shows an example of the MTC group information included in the GPRS attach accept message and the RAU accept message. The MTC group information of Table 1 may be included mandatorily in the GPRS attach accept message and the RAU accept message.

TABLE 1

| IEI | Information Element | Presence | Format | Length |
|---|---|---|---|---|
| | MTC access period | M | V | 1 |
| | MTC access priority | M | V | 1 |
| | MTC offline indication period | M | V | 1 |

Hereinafter, each field of Table 1 will be described.

1) MTC access period field (octet 8): This field indicates a time range in which the MTC device is accessible to the network. This field is used to implement the time controlled feature among the MTC service requirements.

2) MTC access priority field (octet 9): This field is used to implement the time tolerant feature and the PAM feature among the MTC service requirements. A network access right of the MTC device can be defined for each MTC group by a value of the MTC access priority field. That is, the network operator can control an overall network traffic by allowing an access right for each MTC group according to a network load. Table 2 shows an example of the network access right according to the value of the MTC access priority field.

TABLE 2

| Bit(3, 2, 1) | Description |
|---|---|
| 000 | No MTC access is allowed |
| 001 | Priority Alarm Message (PAM) sending only is allowed |
| 010 | Only PAM sending and mobile terminating (MT) are allowed |
| 011 | mobile originating (MO) only is allowed |
| 100 | All MTC services are allowed |
| 101 | spare, shall be interpreted as '100' (All MTC services are allowed) |
| 110 | spare, shall be interpreted as '100' (All MTC services are allowed) |
| 111 | spare, shall be interpreted as '100' (All MTC services are allowed) |

Referring to Table 2, if the value of the MTC access priority field is '000', access is denied for any MTC device included in the MTC group. If the value of the MTC access priority field is '001', only an access of PAM transmission is allowed. If the value of the MTC access priority field is '100', a network access is allowed for all MTC devices within the MTC group. That is, the network can control the overall network load by occasionally monitoring the network traffic. If the network load is great, the value of the MTC access priority field may be decreased to avoid the network access of the MTC device as much as possible. If the network load is small, the value of the MTC access priority field may be increased to dynamically control the network load.

3) MTC offline indication period field (octet 7): This field is used to implement the offline indication feature among the MTC service requirements. The MTC offline indication period field defines a threshold of offline indication to a periodic location registration period for each MTC group. To satisfy the offline indication feature, when it is no longer possible to communicate with the network, the MTC device has to report this to the network within a specific time period. In the present invention, the threshold of the offline indication is set to a periodic RAU cycle to minimize a change of the legacy GERAN system. The periodic RAU cycle is a reference time value when the legacy MS reports to the network that the MS operates normally. By using the reference time value, the network can know that the MS operates normally. Likewise, the threshold value of the offline indication of the MTC device may be set to the periodic RAU cycle. Accordingly, the network can determine whether the MTC device is offline within a time not exceeding the threshold value.

The MTC offline indication period field may consist of a unit field and a timer value field. A threshold of actual offline indication can be calculated by considering a unit defined in the unit field and a time defined in the timer value field. Table 3 shows an example of the unit field constituting the MTC offline indication period field.

TABLE 3

| Bit (8, 7, 6) | Description |
|---|---|
| 000 | value is incremented in multiples of 2 seconds |
| 001 | value is incremented in multiples of 1 minute |
| 010 | value is incremented in multiples of decihours |
| 111 | value indicates that the timer is deactivated |

Referring back to FIG. 5, the network operator transmits an SI message to the MTC device in step S110. When a value of MTC information is altered by using the GPRS attach accept message or the RAU accept message, the network operator reports the altered contents to the MTC device by using the SI message. Each MTC device can detect the altered MTC information by using the SI message, without an additional signaling connection. For this, a new field for the MTC device may be added to the SI message to indicate the MTC information. The SI message of the GERAN may exist from SI1 to SI20, and the new field for the MTC device may be included in any one of the SI1 to the SI20. It is assumed hereinafter that the new field for the MTC device is included in the SI13 for convenience of explanation. The SI13 includes an information element (IE) called rest octets information. A new field for the MTC device can be added in the rest octets information.

Table 4 shows an example of the new field added in the reset octets information for the MTC device.

TABLE 4

< RAC : bit (8) >
< SPGC_CCCH_SUP : bit >
< PRIORITY_ACCESS_THR : bit (3) >
< NUM_MTC_GR : bit (n) >
/* Repeated by a value corresponding to NUM_MTC_GR */
{
< MTC_SUBSCRIPTION_GRID : bit (n) >
< MTC_ACCESS_PERIOD : bit (8) >
< MTC_ACCESS_PRIORITY : bit (3) >
< MTC_IND_PERIOD : bit (8) >
}
< NETWORK_CONTROL_ORDER : bit (2) >

In Table 4, the new field for the MTC device is indicated by a bold font.

1) NUM_MTC_GR: This field indicates the number of MTC groups that transfer MTC information. Transmission of the MTC information is repeated by a value corresponding to NUM_MTC_GR.

2) MTC_SUBSCRIPTION_GRID: This value indicates an identification (ID) of an MTC group or an MTC subscriber to which the altered MTC information is applied. Unlike a GPRS attach process or an RAU process in which a corresponding message is directly transferred to specific MTC information, the altered MTC information is applied for each MTC group in the proposed invention, and thus a field for indicating the ID of the MTC group or the MTC subscriber is newly added.

3) MTC_ACCESS_PERIOD: This field is the same as the MTC access period field described in step S100 of FIG. 5.

4) MTC_ACCESS_PRIORITY: This field is the same as the MTC access priority field described in step S100 of FIG. 5.

5) MTC_IND_PERIOD: This field is the same field as the MTC offline indication period field described in step S100 of FIG. 5.

Hereinafter, a method of providing an MTC service by using a paging request message will be described.

Figure 6:
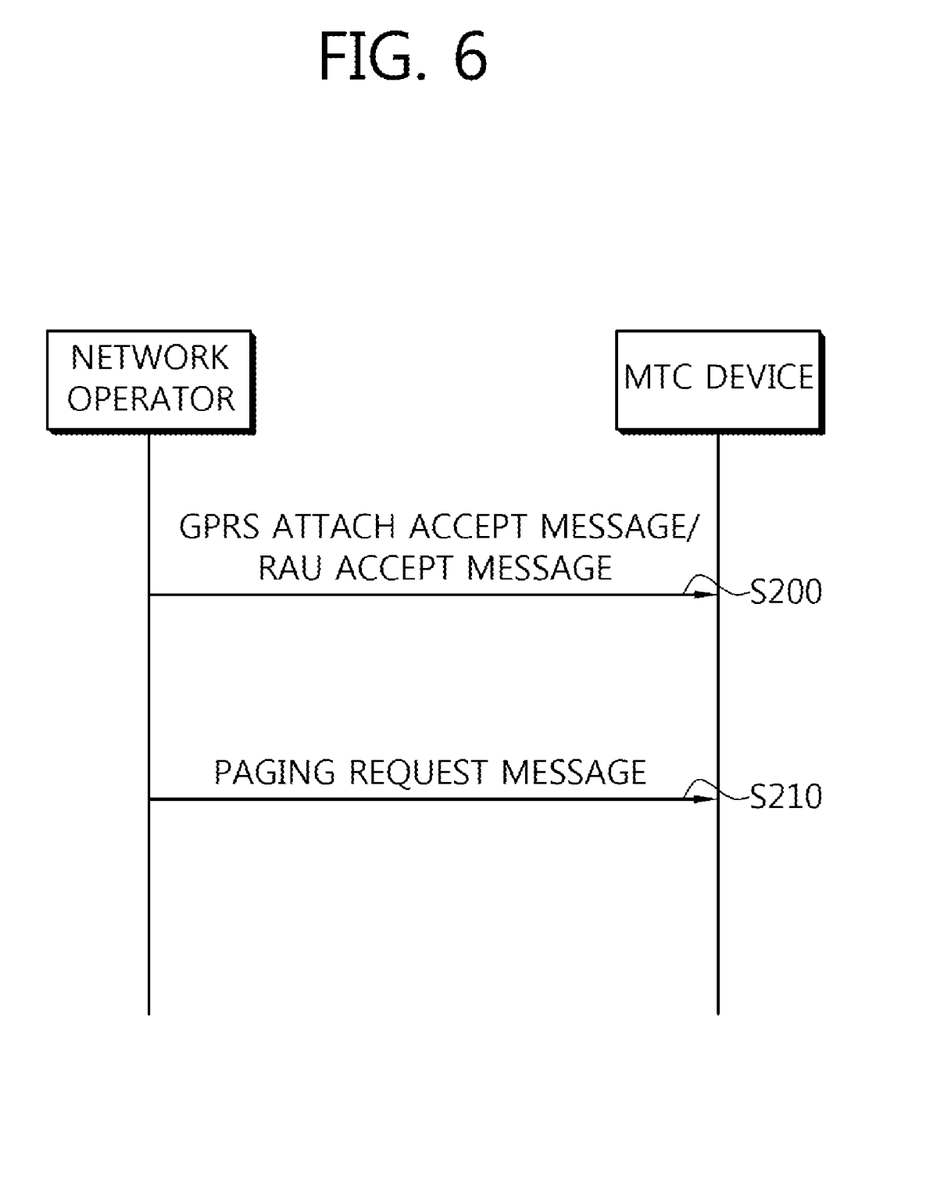
FIG. 6 shows another example of the proposed method of providing an MTC service.

FIG. 6 shows another example of the proposed method of providing an MTC service.

In step S200, a network operator transmits a GPRS attach accept message and an RAU accept message to an MTC device. These messages are the same as the GPRS attach accept message and the RAU accept message described in step S100 of FIG. 5.

In step S210, the network operator transmits a paging request message to the MTC device. When the value of the MTC information is altered by using the GPRS attach accept message and the RAU accept message, the network operator reports the altered contents to the MTC device by using the paging request message. In MBMS, paging is performed in an MBMS session level, not in each device level. Similarly, if the paging is performed on an MTC group basis, not an MTC device basis, by using an MTC group ID, then an additional signaling connection for each MTC device is unnecessary. Accordingly, each MTC device can detect the altered MTC information by using the paging request message without the additional signaling connection. For this, a new field may be added to the paging request message for the MTC device to indicate the MTC information. Although a new field for the MTC device is added to a paging request type2 message in the paging request message in the following description, this is for exemplary purposes only, and thus the present invention is not limited thereto. The paging request type2 message is transmitted on a common control channel (CCCH), and can carry up to three pieces of mobile identity information. At least two MSs can be identified by the up to three pieces of mobile identify information, and $3^{rd}$ mobile indentify information (i.e., mobile identity 3) can carry information on a $3^{rd}$ MS or MBMS session. The new field for the MTC device may be added to the mobile identify 3. Table 5 shows an example of a configuration of the paging request type2 message including the mobile identify 3 to which the new field for the MTC device is added.

TABLE 5

| IEI | Information element | Type | Presence | Format | length |
|---|---|---|---|---|---|
| | L2 Pseudo Length | L2 Pseudo Length | M | V | 1 |
| | RR management Protocol Discriminator | Protocol Discriminator | M | V | ½ |
| | Skip Indicator | Skip Indicator | M | V | ½ |
| | Paging Request Type 2 Message Type | Message Type | M | V | 1 |
| | Page Mode | Page Mode | M | V | ½ |
| | Channels Needed for Mobiles 1 and 2 | Channel Needed | M | V | ½ |
| | Mobile Identity 1 | TMSI/P-TMSI | M | V | 4 |
| | Mobile Identity 2 | TMSI/P-TMSI | M | V | 4 |
| 17 | Mobile Identity 3 | Mobile Identity | O | TLV | 3-10 |
| | P2 Rest Octets | P2 Rest Octets | M | V | 1-11 |

Table 6 shows an example of a page request type3 message according to the proposed method of providing the MTC service.

TABLE 6

| 8 | 7 | 6 | 5 | 4 | 3 | 2 | 1 | |
|---|---|---|---|---|---|---|---|---|
| | | | Mobile Identity IEI | | | | | octet 1 |
| | | | Length of Mobile Identity contents | | | | | octet 2 |
| 0 | 0 | 0 | MCC/MNC indic | odd/even indic | Type of identity | | | octet 3 |
| | spare | | | | | | | |
| | | | MTC Subscription ID | | | | | octet 4 |
| | | | | | | | | octet 5 |
| | | | | | | | | octet 6 |
| | MCC digit 2 | | | MCC digit 1 | | | | octet 6a* |
| | MNC digit 3 | | | MCC digit 3 | | | | octet 6b* |
| | MNC digit 2 | | | MNC digit 1 | | | | octet 6c* |
| | | | MTC Indication period | | | | | octet 7 |
| | | | MTC Access period | | | | | octet 8 |
| 0 | 0 | 0 | 0 | 0 | MTC access priority | | | octet 9 |
| | | | spare | | | | | |

Table 7 shows an example of contents indicated by a 'type of identity' field located in the octet 3 of Table 6.

TABLE 7

| Bit (3, 2, 1) | Description |
|---|---|
| 000 | IMSI |
| 010 | IMEI |
| 011 | IMEISV |
| 100 | TMSI/P-TMSI/M-TMSI |
| 101 | TMGI and optional MBMS Session Identity |
| 110 | MTC Subscription identity |
| 000 | No Identity (note 1) |
| | all other values are reserved. |

Referring to Table 7, when a value of the 'type of identify' field is 110, the MTC subscriber or the MTC group is identified by the mobile identify 3 of the paging request type2 message.

Table 8 shows an example of contents indicated by an odd/even indication field located in the octet 3 of Table 6.

TABLE 8

| Bit (4) | Description |
|---|---|
| 0 | even number of identity digits and also when the TMSI/P-TMSI or TMGI and optional MBMS Session Identity or MTC information is used |
| 1 | odd number of identity digits |

In Table 8, the new field for the MTC device is as follows.

2) MTC SUBSCRIPTION ID: This field indicates an ID of an MTC group or an MTC subscriber to which the changed MTC information is applied. Unlike the GPRS attach process or the RAU process in which a corresponding message is directly transferred by using the specific MTC information, the MTC information is applied for each MTC group in the present invention. Thus, a field indicating the ID of the MTC group or the MTC subscriber is newly added. An MTC device belonging to each MTC group receives an MTC group ID by using the paging request message, and thus can know access period information corresponding to the ID of the MTC group, access priority information based on a network load, periodic location registration information, etc.

3) MTC_ACCESS_PERIOD: This field is the same as the MTC access period field described in step S100 of FIG. 5.

4) MTC_ACCESS_PRIORITY: This field is the same as the MTC access priority field described in step S100 of FIG. 5.

5) MTC_IND_PERIOD: This field is the same as the MTC offline indication period field described in step S100 of FIG. 5.

Meanwhile, instead of adding the new field for the MTC device to the paging request type2 message as described above, the MTC service may be provided by defining a new type of paging request message. Since the existing paging request message is preferentially used for paging of the legacy MS, there is a restriction in that the new field for the MTC device is also added to a field selectively transmitted such as the mobile identify 3 of the paging request type2 message. In addition, since only information on one MTC group can be included, there is a need to define a new type of paging request message in order to include information on more MTC groups. Accordingly, the present invention proposes a paging request type4 message that can include information on up to 4 MTC groups.

Table 9 shows an example of the page request type4 message according to the proposed method of providing the MTC service.

TABLE 9

| IEI | Information element | Type/Reference | Presence | Format | length |
|---|---|---|---|---|---|
| | L2 Pseudo Length | L2 Pseudo Length | M | V | 1 |
| | RR management Protocol Discriminator | Protocol Discriminator | M | V | ½ |
| | Skip Indicator | Skip Indicator | M | V | ½ |
| | Paging Request Type 3 Message Type | Message Type | M | V | 1 |
| | Page Mode | Page Mode | M | V | ½ |
| | Channels Needed for Mobiles 1 and 2 | Channel Needed | M | V | ½ |
| | Mobile Identity 1 | Mobile identity | O | TLV | 3-10 |
| | Mobile Identity 1 | Mobile identity | O | TLV | 3-10 |
| | Mobile Identity 1 | Mobile identity | O | TLV | 3-10 |
| | Mobile Identity 1 | Mobile identity | O | TLV | 3-10 |
| | P3 Rest Octets | P3 Rest Octets | M | V | 3 |

Mobile identity information included in the paging request type4 message of Table 9 may be the same as that described above.

Figure 7:
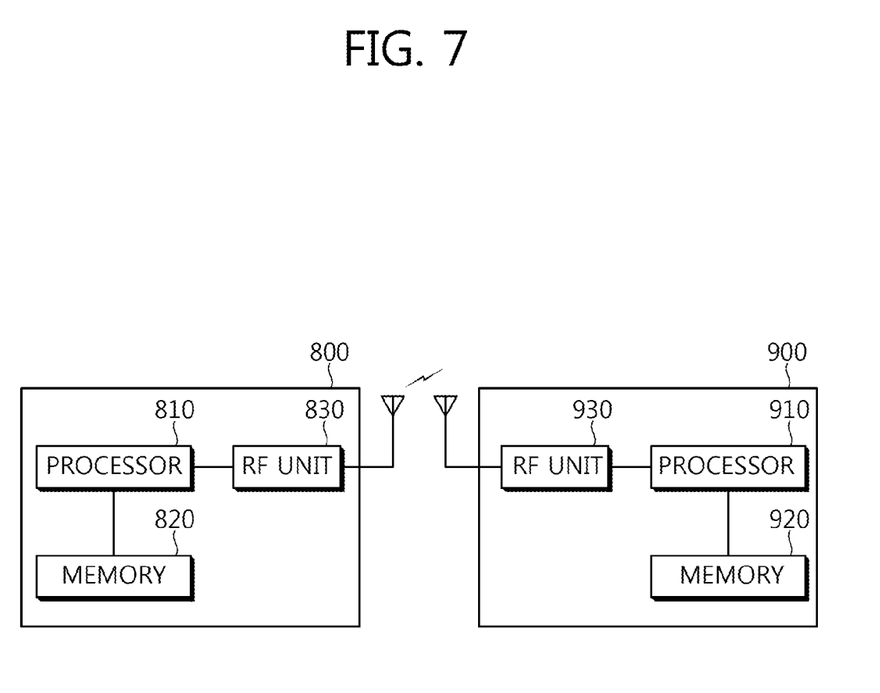
FIG. 7 is a block diagram of a network operator and an MTC device for which an embodiment of the present invention is implemented.

FIG. 7 is a block diagram of a network operator and an MTC device for which an embodiment of the present invention is implemented.

A network operator 800 includes a processor 810, a memory 820, and a radio frequency (RF) unit 830. The processor 810 implements the proposed functions, processes, and/or methods. That is, the method of providing the MTC service proposed in FIG. 5 or FIG. 6 can be implemented. Layers of radio interface protocols can be implemented by the processor 810. The memory 820 is coupled to the processor 810, and stores a variety of information for driving the processor 810. The RF unit 830 is coupled to the processor 810, transmits and/or receives a radio signal, and transmits a system information message or a paging request message.

An MTC device 900 includes a processor 910, a memory 920, and an RF unit 930. The processor 910 implements the proposed functions, processes, and/or methods. Layers of radio interface protocols can be implemented by the processor 910. The processor 910 processes a received system information message or paging request message. The memory 920 is coupled to the processor 910, and stores a variety of information for driving the processor 910. The RF unit 930 is coupled to the processor 910, transmits and/or receives a radio signal, and transmits the system information message or the paging request message.

According to the proposed method, an MTC service can be provided based on MTC group handling. A time controlled feature can be satisfied by an MTC_ACCESS_PERIOD field included in a system information message or a paging request message. The time controlled feature is an MTC feature characterized in that access of an MTC device is allowed within a given access period, and when the access period is altered, this is reported to the MTC device. A time tolerant feature can be satisfied by an MTC_ACCESS_PRIORITY field included in the system information message or the paging request message. The time tolerant feature is an MTC feature characterized in that MTC devices delay their data transfer, a network determines a traffic load for each MTC group, and the MTC devices have to determine the determined traffic load. An offline indication feature can be satisfied by an MTC_IND_PERIOD field included in the system information message or the paging request message. The offline indication feature is characterized in that a timely notification has be to sent to the network when it is no longer possible to maintain signaling between the MTC device and the network. Accordingly, an effective operation of the MTC device is guaranteed.

A service requirement of a machine-type communication (MTC) device is satisfied by performing MTC group handling, thereby guaranteeing an effective operation of the MTC device.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of providing a machine-type communication (MTC) service in a wireless communication system, the method comprising:
    transmitting a general packet radio service (GPRS) attach accept message and a routing area update (RAU) accept message to the MTC device, the GPRS attach accept message and the RAU accept message including MTC group information for at least one MTC group; and
    transmitting a system information (SI) message of a GSM/EDGE radio access network (GERAN) or a paging request message to the MTC device, the SI message or the paging request message including the MTC group information and an identifier (ID) of an MTC group,
    wherein the MTC group is a group of MTC devices that share one or more MTC features,
    wherein the MTC group information includes MTC offline indication period information indicating a threshold of a time for reporting network inaccessibility to the network when the MTC device in the MTC group is unable to access to the network,
    wherein the threshold is a cycle of a periodic routing area update (RAU).

2. The method of claim 1, wherein the SI message is transmitted by being added to a Reset octets information of SI13 in the SI message.

3. The method of claim 1, wherein the paging request message is transmitted by being added to 3rd mobile identify information of a paging request type2 message in the paging request message.

4. The method of claim 1, wherein the paging request message is transmitted by being added to a paging request type4 message newly defined in the paging request message.

5. The method of claim 4, wherein the MTC group information is transmitted by being added to a paging request type4 message newly defined in the paging request message.

6. The method of claim 1, wherein the paging request message includes a type of identity field indicating an MTC subscription identity.

7. The method of claim 1, wherein the MTC group information includes MTC access period information indicating a time range in which the MTC device in the MTC group is accessible to a network.

8. The method of claim 1, wherein the MTC group information includes MTC access priority information indicating a network access right of the MTC group and determined based on a network load.

9. The method of claim 1, wherein the number of the at least one MTC group is less than or equal to four.

10. A base station in a wireless communication system, the base station comprising:
- a radio frequency (RF) unit configured for transmitting or receiving a radio signal; and
- a processor coupled to the RF unit, and configured for:
  - transmitting a general packet radio service (GPRS) attach accept message and an routing area update (RAU) accept message to the MTC device, the GPRS attach accept message and the RAU accept message including MTC group information for at least one MTC group; and
  - transmitting a system information (SI) message of a GSM/EDGE radio access network (GERAN) or a paging request message to the MTC device, the SI message or the paging request message including the MTC group information and an identifier (ID) of an MTC group,
- wherein the MTC group is a group of MTC devices that share one or more MTC features,
- wherein the MTC group information includes MTC offline indication period information indicating a threshold of a time for reporting network inaccessibility to the network when the MTC device in the MTC group is unable to access to the network,
- wherein the threshold is a cycle of a periodic routing area update (RAU).

11. A machine-type communication (MTC) device in a wireless communication system, the MTC device comprising:
- radio frequency (RF) unit configured for transmitting or receiving a radio signal; and
- a processor, coupled to the RF unit, configured for;
- receiving a general packet radio service (GPRS) attach accept message and an routing area update (RAU) accept message to the MTC device, the GPRS attach accept message and the RAU accept message including MTC group information for at least one MTC group;
- receiving a system information (SI) message of a GSM/EDGE radio access network (GERAN) or a paging request message to the MTC device, the SI message or the paging request message including the MTC group information and an identifier (ID) of an MTC group; and
- processing the MTC group information,
- wherein the MTC group information includes MTC offline indication period information indicating a threshold of a time for reporting network inaccessibility to the network when the MTC device in the MTC group is unable to access to the network,
- wherein the threshold is a cycle of a periodic routing area update (RAU).

* * * * *